Patented Feb. 12, 1952

2,585,827

UNITED STATES PATENT OFFICE 2,585,827

RESINOUS COMPOSITIONS AND METHODS OF PREPARING THE SAME

John J. Padbury, Stamford, and Edward L. Kropa, Old Greenwich, Conn., assignors to American Cyanamid Company, New York, N. Y., a corporation of Maine No Drawing. Application April 1, 1947, Serial No. 738,738

7 Claims. (Cl. 260—22)

The present invention relates to new and useful compositions, specifically resinous compositions, which are especially suitable for use in the plastics and coating arts, and to methods of preparing the same. More particularly the invention is concerned with compositions comprising a resinous material obtained by reaction of ingredients comprising a polyhydric alcohol and a perfluoro saturated aliphatic polycarboxylic acid or an anhydride thereof, specifically tetrafluorosuccinic acid or anhydride; and with methods of preparing such compositions. The scope of the invention includes soluble, fusible alkyd resins which are heat-convertible (heat-curable) to a substantially insoluble, substantially infusible state, which resins are products of reaction of ingredients comprising a polyhydric alcohol and tetrafluorosuccinic acid, as well as products comprising such alkyd resins in a substantially insoluble, substantially infusible state. The invention herein claimed is directed specifically to resinous polyesters of a polyhydric alcohol in which the hydroxyl groups are the only substituents thereof which are reactive in an esterification reaction, and which is further characterized by being a polymer of an alcohol having an unsaturated linkage between two carbon atoms in an aliphatic grouping, one of which carbon atoms is directly linked to a saturated carbinol carbon atom. These polyesters are further characterized by the fact that they contain a plurality of different acyl groups, at least 25 mol per cent of which are tetrafluorosuccinyl groups and the remainder include at least 1 mol per cent of acyl groups of a monocarboxylic acid selected from the class consisting of nuclearly halogenated benzoic acids, and mono-, di- and trihalogenoalkylbenzoic acids, the carboxyl group of the said monocarboxylic acid being the only substituent thereof which is reactive in an esterification reaction; and to methods of preparing such resinous polyesters.

Alkyd resins are the resins obtained by the reaction of a polyhydric alcohol with a polycarboxylic acid or anhydride in the presence or absence of various modifying substances. Various polycarboxylic acids and anhydrides thereof have been used or suggested for use in the manufacture of alkyd resins, including aromatic polycarboxylic acids and anhydrides (e. g., phthalic acid and anhydride), alpha,beta-unsaturated polycarboxylic acids and anhydrides (e. g., maleic and fumaric acids, maleic anhydride, etc.) and saturated aliphatic polycarboxylic acids (e. g., succinic acid and anhydride). The broad suggestion also has been made that chloro-, bromo- and iodo-substituted aliphatic polycarboxylic acids, including substituted succinic acid, be used as the polycarboxylic acid reactant in the preparation or alkyd resins. The suggestion apparently had reference only to the mono or lower poly (i. e., incompletely halogenated) chloro-, bromo- and iodo-substituted polycarboxylic acids. Tetrafluorosuccinic acid or anhydride obviously was not embraced and was not intended to be embraced by the suggestion, since tetrafluorosuccinic acid has only recently become known to the art while tetrafluorosuccinic anhydride is believed to be a new chemical compound. Further evidence that the perchloro-, perbromo- and periodopolycarboxylic acids were not embraced and were not intended to be embraced by the suggestion is found in the fact that attempts to prepare certain of these acids, specifically tetrachlorosuccinic acid, have been unsuccessful probably because of the instability of the compound. Evidence of this instability is borne out by the fact that diethyl tetrachlorosuccinate (prepared by the action of copper powder on ethyl trichloroacetate) decomposes with the evolution of a large amount of hydrogen chloride when heated at 175° C. On the other hand, esters of tetrafluorosuccinic acid show no evidence of decomposition even when heated for prolonged periods above 200° C.

To the best of our knowledge and belief it was not known or suggested prior to our invention that tetrafluorosuccinic acid or anhydride or mixtures thereof could be used advantageously as a reactant with a polyhydric alcohol to yield alkyd resins having properties quite different from those obtained when a non-halogenated succinic acid or a chloro-, bromo- or iodo-substituted succinic acid, more particularly a mono or lower poly chloro-, bromo- or iodo-substituted succinic acid, is used as a reactant with a polyhydric alcohol.

The present invention is based on our discovery that new and valuable materials having particular utility in the plastics, coating and other arts can be produced as broadly described in the first paragraph of this specification and more particularly hereafter; and upon our further discovery that by using tetrafluorosuccinic acid or anhydride or mixtures thereof as at least one of the polycarboxylic reactants in the preparation of an alkyd resin, we are able to obtain resinous and other compositions having new and improved properties over similar compositions heretofore known or suggested, e. g., alkyd resins made from succinic acid or from chloro-, bromo- or iodo-substituted succinic acids, especially the mono- and dichloro, mono- and dibromo-, and mono- and diiodo-substituted succinic acids. For example, alkyd resins made from chloro-, bromo- or iodo-substituted succinic acid have relatively low decomposition points under heat which make them useless for many industrial applications. Moreover, resins made from the bromo and iodo derivatives usually have the further disadvantage that they are objectionably discolored or have poor color stability upon aging or under heat, while those made from, for example, the chloro derivatives etch metals, e. g., steel, when exposed to strong ultraviolet light in contact therewith. In marked contrast, comparable alkyd resins made from tetrafluorosuccinic acid or anhydride (or mixtures thereof) have substantially greater stability under heat than resins similarly made from the chloro-, bromo- or iodo-substituted succinic acids heretofore suggested for use in alkyd-resin manufacture; show little or no tendency to etch steel and other metals when exposed to strong ultraviolet light in contact therewith; and, furthermore, generally have a better color originally (i. e., when first made) and better color stability both upon aging and under heat than corresponding resins made from the aforementioned chloro-, bromo- and iodo-substituted succinic acids. This was quite surprising and unexpected and in no way could have been predicted either from the properties of the acids themselves or from the properties of alkyd resins heretofore known in the art.

The tetrafluorosuccinic acid or anhydride (or mixtures thereof) which is used in practicing our invention is characterized by particular and unique properties (e. g., heat-, flame- and chemical-resistance characteristics), which are not possessed by conventional saturated aliphatic polycarboxylic acids including succinic acid, and these properties are imparted to a large extent to alkyd resins made from such an acid or anhydride. This also was unobvious and unpredictable, since it would be more likely to expect that the characteristic properties of tetrafluorosuccinc acid and anhydride would be impaired under the temperature and other conditions normally employed in the manufacture of an alkyd resin by reaction of ingredients comprising a polyhydric alcohol and a polycarboxylic acid.

Another advantage flowing from our invention is that the alkyd resins produced in accordance therewith are relatively easy to work or handle in subsequent operations. This ease of workability or handling is in marked contrast to that of many of the highly fluorinated resinous materials (e. g., polymeric tetrafluoroethylene) now being used or which have been suggested for use in the plastics and coating arts. The present invention therefore provides a resinous composition which readily can be incorporated into coating or other compositions or, especially in the case of certain polymerizable resinous compositions hereafter more fully described, can be readily molded or otherwise fabricated into useful articles of manufacture without material sacrifice of the good electrical characteristics and the improved heat-, flame- and chemical-resisting properties imparted thereto by reason of its substantial percentage of fluorine. Other improved properties, including high resistance to heat, abrasion and organic solvents, of the cured alkyd resins of this invention make our new resins suitable for use in fields of utility, for instance in electrically insulating and coating applications, for which resins of lesser resistance to heat, flame, abrasion, and organic solvents (e. g., alkyd resins made from a non-halogenated succinc acid) would be entirely unsuited. The resinous compositions of this invention may be prepared in the form of air-drying or baking types of materials and hence have wide application in industry, e. g., in the paint, varnish, lacquer and electrical insulation fields. After air-drying or curing the resin films possess excellent oil, organic solvent and aging resistance, as well as resistance to discoloration upon aging or under heat.

Various methods may be employed in preparing the alkyd resins with which the present invention is concerned. They may be prepared by the direct esterification of the reactants in the presence or absence of various modifying reactants such as are now commonly used in the manufacture of other alkyd resins or, if more than two reactants are employed, by various permutations of reactants. For example, if a monocarboxylic acid-modified tetrafluorosuccinc polyester is desired, it may be prepared either by the simultaneous interesterification of all the reactants or by first forming a partial reaction or esterification product of a polyhydric alcohol, e. g., glycerol, polymeric allyl alcohol, etc., and a monocarboxylic acid or anhydride, e. g., acetic anhydride, benzoic acid, mono-, di- or trifluoromethyl benzoic acid, tall oil acids, fatty acids of a drying oil, etc., and then effecting reaction between this partial esterification product and tetrafluorosuccinic acid or anhydride. By this latter method better results sometimes are obtained, e. g., when a highly reactive polyhydric alcohol such, for instance, as polyallyl alcohol is employed, especially from the standpoint of obtaining a resin of the desired acid number without gelation.

The proportions of the reactants may be considerably varied, but ordinarily we use an excess of the polyhydric alcohol over the theoretical quantity needed for complete esterification of the acid or anhydride reactant since excess acid in the resin is generally considered undesirable whereas a small excess of the polyhydric alcohol is not objectionable, and in some cases may even be very desirable, for example, in improving the compatibility of the alkyd resin with urea-formaldehyde, melamine-formaldehyde or other resinous materials. The presence of some unesterified hydroxyl groups also is sometimes beneficial in obtaining better compatibility of the alkyd resin with other resinous compositions, examples of which have been given above. When an excess of the polyhydric alcohol is employed, a suitable amount is, for example, from about 3 to 30% or more, usually about 5 to 10%, in excess of that required for complete esterification of the acid or acids (or anhydride or anhydrides) employed.

Various polyhydride alcohols may be caused to react with tetrafluorosuccinic acid or anhydride or mixtures thereof in producing our new alkyd resins, examples of which are, in addition to those mentioned in the first paragraph of this specification, pentaerythritol, dipentaerythritol, neopentyl glycol, dineopentyl glycol, trimethylol propane, 1,4-butanediol, 2-butene-1,4-diol, 2-butyne-1,4-diol, trimethylene glycol, tetramethylene glycol, hexamethylene glycol, octamethylene glycol, decamethylene glycol, dodecamethylene glycol, 2-ethyl-1,3-hexanediol, triethylene glycol, tetraethylene glycol, pentaethylene glycol, hexaethylene glycol, octaethylene glycol, decaethylene glycol, 2-butyl-1,3-octanediol, 2-ethyl-2-methylol-1-hexanol (2-ethyl-2-butyl-1,3-propanediol), 6-methyl-2,4-heptanediol, polymethallyl alcohol and other polymeric alcohols such as are disclosed in the copending application of Harry F. Pfann and Edward L. Kropa, Serial No. 738,736, filed concurrently herewith. Other polyhydric alcohols that may be employed include dipropylene glycol [(CH₃CHOHCH₂)₂O], dibutylene glycol, dipentylene glycol, dihexylene glycol, di-(2-hydroxyamyl) ether, etc. Mixtures of polyhydric alcohols may be employed if desired, e. g., a mixture of glycerol and ethylene glycol, of diethylene glycol and a polymeric allyl alcohol containing an average of at least five primary hydroxyl groups per molecule, etc.

Polyhydric alcohols which are particularly useful in carrying the present invention into effect are those polymeric alcohols disclosed in the aforementioned Pfann and Kropa copending application Serial No. 738,736, which application relates to compositions comprising a resinous product of reaction of ingredients comprising (1) a monocarboxylic acid, more particularly an aromatic monocarboxylic acid, a saturated or unsaturated aliphatic monocarboxylic acid, etc., (2) a polycarboxylic acid (e. g., di-, tri- or tetracarboxylic acid) and (3) a polymer of an alcohol having an unsaturated linkage between two carbon atoms in an aliphatic grouping, one of which carbon atoms is directly linked to a saturated carbinol carbon atom, more particularly a polymer of an aliphatic monohydric alcohol having a terminal methylene grouping attached by an olefinic double bond to a carbon atom which is directly linked to a saturated carbinol carbon atom, e. g., polymers of allyl alcohol and methallyl alcohol, specifically polymers of such alcohols wherein the average number of primary hydroxyl groups per molecule is between three or four and about ten. By using such polymeric alcohols in practicing the present invention, alkyd resins having improved water resistance and hardness are obtained. Such polymeric alcohols, more particularly the water-insoluble polymers of the aforementioned unsaturated alcohols, have particular and unique properties, e. g., water resistance and a high degree of reactivity, so that soluble, fusible alkyd resins made therefrom can be readily insolubilized, which properties are not possessed by conventional polyhydric alcohols, e. g., glycerol, and these properties are imparted to a large extent to alkyd resins made from such polymeric alcohols, including polymers of an aliphatic monohydric alcohol having a terminal methylene grouping attached by an olefinic double bond to a carbon atom which is directly linked to a

grouping, more particularly a —CH₂OH grouping. Illustrative examples of unsaturated alcohols, in addition to allyl alcohol and methallyl alcohol, which may be polymerized and the polymers used advantageously in carrying the present invention into effect are given in the aforementioned Pfann and Kropa application, wherein also are given methods of producing such polymeric alcohols. A method of polymerizing methallyl alcohol is disclosed and specifically claimed in Pfann and Kropa Patent No. 2,401,959, issued June 11, 1946.

When polymers of unsaturated alcohols, e. g., polymeric allyl alcohol, are used in making our new alkyd resins, we prefer to partially esterify such an alcohol, e. g., at a temperature within the range of 150° to 250° C., with a monocarboxylic acid, e. g., a substituted or unsubstituted benzoic acid, fatty acids of a drying oil, etc., and then esterify the resulting partial esterification product, e. g., at a temperature within the aforementioned temperature range, with tetrafluorosuccinic acid or anhydride or with a mixture thereof.

The tetrafluorosuccinic acid or anhydride should be used in a substantial proportion in order to obtain the advantage of this invention. Obviously the substitution of tetrafluorosuccinic acid or anhydride for only a small part of the polycarboxylic acid or anhydride heretofore used in the production of alkyd resins will result in only a relatively small improvement in the properties of the product. The tetrafluorosuccinic acid or anhydride (or mixtures thereof) may constitute the sole polycarboxylic reactant or, as indicated above, substantial proportions thereof may be used in conjunction with other polycarboxylic acids or anhydrides, more particularly an aromatic dicarboxylic or other polycarboxylic acid or anhydride, an alpha, beta-unsaturated dicarboxylic or other polycarboxylic acid or anhydride, a saturated aliphatic dicarboxylic or other polycarboxylic acid or anhydride other than tetrafluorosuccinic acid or anhydride, etc. Improvements in properties such as have been mentioned hereinbefore are obtained when the tetrafluorosuccinic acid or anhydride constitutes at least 25 mol per cent of the total polycarboxylic reactants or, if a modifying monocarboxylic reactant is employed, at least 25 mol per cent of the total monocarboxylic and polycarboxylic reactants. Thus, we may produce alkyd resins in accordance with the present invention by reaction of ingredients comprising (1) a polyhydric alcohol, more particularly a dihydric alcohol (e. g., diethylene glycol), a trihydric alcohol (e. g., glycerol), etc., (2) from 25 to 75 mol per cent of an alpha,beta-unsaturated polycarboxylic acid or anhydride, more particularly an alpha,beta-unsaturated dicarboxylic acid or anhydride (e. g., fumaric acid, maleic anhydride, etc.), or of an aromatic polycarboxylic acid or anhydride (e. g., phthalic acid and anhydride), or of a saturated aliphatic polycarboxylic acid or anhydride other than tetrafluorosuccinic acid or anhydride (e. g., adipic acid, sebacic acid, etc.) and (3) from 75 to 25 mol per cent of tetrafluorosuccinic acid or anhydride or mixture thereof.

By using a modifying alpha,beta-unsaturated polycarboxylic acid or anhydride in the aforementioned mol percentages with tetrafluorosuccinic acid or anhydride, a modified polymerizable unsaturated alkyd resin having improved properties is obtained upon reaction of the mixed acids with a dihydric or other polyhydric alcohol. Such polymerizable unsaturated alkyd resins may be copolymerized with other monomeric materials, especially those which contain a CH₂=C< grouping, e. g., diallyl tetrafluorosuccinate and other unsaturated monohydric alcohol esters of tetrafluorosuccinic acid such as are disclosed in our copending application Serial No. 738,737, filed concurrently herewith, now Patent No. 2,539,438, dated January 30, 1951. They also may be copolymerized with styrene, methyl methacrylate, vinyl acetate, diallyl phthalate and other monomeric materials containing a CH₂=C< grouping and which are copolymerizable with the aforesaid unsaturated alkyd resin, numerous examples of which monomers are given in one aforementioned copending application and in other applications identified therein.

Illustrative examples of modifying polycarboxylic acid reactants that may be employed in producing our new resinous materials are malonic, succinic, glutaric, adipic, pimelic, suberic, azelaic, sebacic, tricarballylic, maleic, fumaric, citraconic, mesaconic, itaconic, acetylene dicarboxylic, phthalic, terephthalic, benzoylphthalic, diphenic, etc. If available, the anhydrides of such acids may be employed.

The term "acid" as sometimes used generally in this specification for purpose of brevity with regard to the carboxylic (both monocarboxylic and polycarboxylic, including tetrafluorosuccinic) reactants includes within its meaning the anhydride thereof since the anhydrides may be used equally as well as the acids themselves.

Among the preferred compositions of this invention are those which comprise a resinous material obtained by reaction of ingredients comprising (1) a polyhydric alcohol, e. g., glycerol, polyallyl alcohol, etc., (2) a monocarboxylic acid, e. g., benzoic acid, trifluoromethyl benzoic acid, fatty acids of a drying oil, etc., and (3) tetrafluorosuccinic acid or anhydride or a mixture thereof, more particularly soluble, fusible alkyd resins produced by the reaction of the aforementioned reactants and which are heat-convertible to a substantially insoluble, substantially infusible state.

A wide variety of monocarboxylic acids or mixtures thereof may be used in producing the aforementioned compositions, including saturated and unsaturated aliphatic monocarboxylic acids and aromatic monocarboxylic acids. Illustrative examples of such acids are acetic, phenylacetic, propionic, butyric, valeric, caproic, heptylic, caprylic, nonylic, capric, palmitic, margaric, stearic, acrylic, methacrylic, crotonic, oleic, palmitoleic, linoleic, linolenic, arachidonic, clupanodonic, licanic, eleostearic, ricinoleic, ricinic, lactic, benzoic, nuclearly halogenated benzoic (more particularly the various known chloro-, bromo-, iodo- and fluorobenzoic acids), mono-, di- and trihalogenoalkyl benzoic (e. g., mono-, di- and trichloromethyl benzoic acids, mono-, di- and tribromomethyl benzoic acids, mono-, di- and trifluoromethyl benzoic acids, etc.), toluic, salicylic, abietic, tall oil, which contains both rosin acids and unsaturated fatty acids, etc. A single or a plurality of monocarboxylic acids may be employed. We may use acids derived from non-drying, semi-drying or drying oils, e. g., the fatty acids of tung oil, hemp-seed oil, candle nut oil, linseed oil, perilla oil, safflower oil, soya bean oil, oiticica oil, castor oil, dehydrated castor oil, blown castor oil, isomerized linseed oil, fish oils, blown fish oils, rubberseed oil, rapeseed oil, cottonseed oil, coconut oil, poppyseed oil, sunflowerseed oil, palm oil, corn oil, wheat oil, sesame oil, peanut oil, olive oil, etc. Natural resins such, for example, as wood rosin, gum rosin, shellac, etc., may be used as a modifying reactant if desired.

Oils such as mentioned above are mainly glycerides, more particularly triglycerides, of fatty acids. Such oils may be used instead of the acids themselves as a starting reactant. When the oils are used alcoholysis occurs, that is, glycerol is split off thereby allowing the fatty acids to combine with the polyhydric alcohol. In such an ester interchange reaction an agent for promoting or accelerating the reaction usually is employed, for example, a basic material such as sodium or potassium hydroxide or carbonate, calcium hydroxide, etc. The glycerol ordinarily is not removed from the reaction mass, since it will react with any esterifiable groupings present in the monocarboxylic and polycarboxylic acid reactants, thereby further to modify the properties of the finished alkyd resin.

Instead of the various triglycerides mentioned above the various monoglycerides and diglycerides of the fatty acids also may be employed.

When air-drying or rapidly curing resins are desired, a semi-drying or drying oil or fatty acids derived from such oils are used. When a polyhydric alcohol containing a large number of hydroxyl groups is employed, e. g., a polymeric alcohol containing an average of five to ten or more primary hydroxyl groups per molecule, a large number of unsaturated fatty acid radicals can be caused to react with these hydroxyl groups, so that the resulting heat-curable alkyd resin has a high degree of functionality and can polymerize very readily. By using a polyhydric alcohol of such a high reactivity, air-drying alkyds can be prepared using semi-drying oils, e. g., palm, corn, cottonseed, sesame, etc., oils, or acids derived therefrom, as the modifying reactant. The drying properties of alkyds prepared from drying oils or drying-oil acids and a polycarboxylic acid including tetrafluorosuccinic acid are improved by using one or more of the aforementioned polymeric alcohols as the polyhydric alcohol reactant in making the alkyd resin.

Fatty acids obtained by the hydrolysis or saponification of animal or vegetable oils such as above mentioned are preferred when it is desired to avoid the presence of glycerol in the reaction mass. Either mixed fatty acids derived from such oils or the individual acids present therein in relatively pure state, e. g., saturated or unsaturated aliphatic monocarboxylic acids, may be employed. Unsaturated aliphatic monocarboxylic acids, and especially the polyunsaturated aliphatic monocarboxylic acids, e. g., linoleic, linolenic, eleostearic, etc., are preferred when resinous compositions having optimum air-drying characteristics are desired.

Tall oil advantageously may be used as a modifying reactant in producing the resins of the present invention. It consists mainly of fatty acids, fatty acid soaps, rosin acids and unsaponified fats. Either crude or refined tall oils may be used, or tall oil fatty acids, or mixtures containing tall oil fatty acids and rosin acids. We may use tall oil which has been treated to improve its color and odor by heating with metallic zinc as more fully described and claimed in the copending application of Jerry J. Smerechniak and George W. Barlow, Serial No. 732,932, filed March 6, 1947, now Patent No. 2,515,739, dated July 18, 1950. By the generic term "tall oil acids" we mean both the individual monocarboxylic acid components of tall oil in relatively pure state, as well as the crude and refined mixtures of tall oil acids as ordinarily produced regardless of the relative proportions of ingredients in the mixture.

Instead of using a monocarboxylic acid as a modifying reactant, we may use an anhydride thereof if available.

The polymeric alcohols which may be used as the polyhydric alcohol reactant with tetrafluorosuccinic acid or anhydride in preparing our new resins have a high reactivity and, unless considerable care be taken, tend to form a gel when used alone as a reactant with the aforementioned acid or anhydride before a resin having a sufficiently low acid number has been obtained. The addition of rosin, tall oil or other monocarboxylic acid or monocarboxylic acid-containing material, numerous examples of which have been given above, minimizes the possibility of gelation and allows the reaction to proceed until a resin of lower acid number has been obtained.

When a monocarboxylic acid is used as a modifying reactant it will be understood, of course, that it replaces a part (e. g., from 1 to 75 mol per cent) of the polycarboxylic reactant including tetrafluorosuccinic acid or anhydride or mixture thereof in an esterification reaction with a polyhydric alcohol or with a mixture of a polyhydric alcohol and a monohydric alcohol.

If desired, the properties of the resins of this invention also may be modified by incorporating a saturated or unsaturated aliphatic monohydric alcohol into the resin. The monohydric alcohol may be used alone as the modifying reactant or it may be used in conjunction with a monocarboxylic acid or with a polycarboxylic acid other than tetrafluorosuccinic acid. Illustrative examples of monohydric alcohols which thus may be employed are methyl, ethyl, propyl, isopropyl, butyl, isobutyl, amyl, hexyl, octyl, cetyl, benzyl, cyclohexyl, tetrahydroabietyl, etc., alcohols; and alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc. The saturated aliphatic monohydric alcohols are particularly useful as an aid in continuing the reaction, without gelation, until the acid number has reached the desired point. Such alcohols internally plasticize the resin and, especially with a trihydric or higher polyhydric alcohol reactant, tend to yield heat-curable products which are less hard, lower in melting point and more soluble in organic solvents than the products obtained when such alcohols are omitted. Saturated aliphatic monocarboxylic acids, e. g., acetic, butyric, stearic, palmitic, etc., also internally plasticize the resin and tend to yield products which are softer and more soluble in organic solvents than the resins obtained when an unsaturated aliphatic monocarboxylic acid is used. When a monohydric alcohol is used it will be understood, of course, that it replaces a part of the polyhydric alcohol, e. g., from about 3 to about 30 mol per cent thereof, in an esterification reaction with the polycarboxylic acid including tetrafluorosuccinic acid.

The resinous compositions of this invention may be prepared by heating all of the reactants together at an elevated temperature, e. g., at a temperature within the range of 150° to 250° C. or higher (e. g., in some cases as high as 290° or 300° C.), or by various permutations of reactants. The reactants advantageously are used in relative proportions such as have been mentioned hereinbefore. When using a polymeric alcohol as a reactant with a monocarboxylic acid and a polycarboxylic acid including tetrafluorosuccinic acid, the proportions of the acids advantageously may be from 25 to 70 mol per cent of the polycarboxylic acid, specifically dicarboxylic acid, to from 75 to 30 mol per cent of the monocarboxylic acid. When light-colored products are desired the reaction preferably is conducted in an atmosphere free from oxygen. An inert atmosphere, e. g., an atmosphere of carbon dioxide, flue gases, nitrogen, etc., over the reaction mass also advantageously is employed when a drying or semi-drying fatty acid or mixture of fatty acids is used as a monocarboxylic acid reactant.

In order that those skilled in the art better may understand how the present invention may be carried into effect, the following examples are given by way of illustration and not by way of limitation. All parts are by weight. The acid numbers and ranges of acid numbers given in the examples are calculated from the amount of water evolved during the reaction. This method is preferred because of difficulty in obtaining accurate acid numbers by conventional methods when alkyd resins are made from tetrafluorosuccinic acid or anhydride.

*Example 1*

| | Parts |
|---|---|
| Ethylene glycol | 18.6 |
| Tetrafluorosuccinic acid | 57.0 |
| Xylene | 173.0 | are heated together under reflux with a slow stream of carbon dioxide passing into the mixture. The water evolved during the esterification reaction is entrained by the xylene, separated in a trap, and the xylene returned continuously to the reaction vessel. After refluxing for 8½ hours, 9 parts of water of esterification is collected. This amount of water of esterification corresponds to an acid number of 73 for the esterification product. The reaction mass is cooled, and the immiscible xylene layer is decanted. The viscous resin that remains is further heated for 3 hours at 225° C. under a reduced pressure of 2 mm. A clear, viscous alkyd resin is obtained. This resin is soluble in dioxane but insoluble in benzene and chloroform. The resin is suitable for use as a plasticizer of other synthetic resins, e. g., glyceryl phthalate resins.

Tetrafluorosuccinic acid may be prepared, for example, as described in our copending application Serial No. 731,422, filed February 27, 1947, now Patent No. 2,502,478, dated April 4, 1950.

*Example 2*

| | Parts |
|---|---|
| Glycerol | 20.2 |
| Tetrafluorosuccinic acid | 57.0 | are heated together, under an atmosphere of carbon dioxide, at a temperature of 197° to 200° C. for 25 minutes, yielding a soluble, fusible resin. The water evolved during the esterification amounts to 8.9 parts. This corresponds to an acid number of 87 for the resin. Upon heating a sample of the resin on a glass plate at 170° C. for 10 minutes, a clear, hard, insoluble film is formed on the plate.

The resinous material of this example is suitable for use in adhesive, filling and other compositions, for treating cotton, linen and other cellulosic materials in cloth or other form, and for other applications.

*Example 3*

| | Parts |
|---|---|
| Ethylene glycol | 19.5 |
| Tetrafluorosuccinic acid | 57.0 | are heated together in a reaction vessel fitted with a tube for the introduction of carbon dioxide over the surface of the reaction mass. The vessel is placed in a heated oil bath. Heating is continued for ½ hour under a carbon dioxide atmosphere at an oil bath temperature of 175° C., then at 190° C. for another half hour, after which the bath temperature is increased to 210° C., and heating is continued at this higher temperature for 6 hours, during which time 10 parts of water of esterification is collected. This amount of water corresponds to an acid number for the esterification product of 38. The product is a viscous resin which does not crystallize upon standing for about 16 hours at room temperature. Upon heating this liquid resin for 7 hours at 220° C. under 1 mm. pressure, a clear, straw-colored, very viscous resin which solidifies after standing for 1 month is obtained. The liquid resin may be used as a plasticizer for glyceryl phthalate and other synthetic resins. The resinous composition of this example improves the flame-resisting and other characteristics of the resinous or other flammable compositions or products with which it is incorporated.

*Example 4*

| | Parts |
|---|---|
| Diethylene glycol | 31.3 |
| Tetrafluorosuccinic acid | 57.0 |
| Redistilled xylene (B. P. 134–140° C.) | 173.0 | are heated together under reflux in a reaction vessel fitted with a carbon dioxide inlet tube and a Barrett trap. The trap previously is filled with redistilled xylene. Heating is continued under reflux, while passing carbon dioxide over the reaction mass, for 5 hours. The xylene is distilled off by heating at atmospheric pressure in a 220° C. oil bath, after which heating is continued at the same bath temperature for 7 hours under a pressure of less than 1 mm. A clear, very viscous, amber-colored resin having an acid number of 40 is obtained. It is suitable for use in film-forming glyceryl phthalate and other compositions to impart toughness, flexibility and flame-resistance to the cured film.

*Example 5*

| | Parts |
|---|---|
| Phthalic anhydride | 148.1 |
| Tetrafluorosuccinic acid | 87.7 |
| Fumaric acid | 4.5 |
| Stearic acid | 125.6 |
| Glycerol | 143.8 | are heated together under an atmosphere of carbon dioxide at 175° to 205° C. until a soluble fusible resin having an acid number of 30 to 40 is obtained.

*Example 6*

| | Parts |
|---|---|
| Polymeric allyl alcohol having a hydroxyl number of about 680 | 130 |
| Tetrafluorosuccinic acid | 95 |
| Fatty acids of dehydrated castor oil | 140 | are heated together while agitating with carbon dioxide, which blankets the reaction mass, at 180° to 200° C. until a heat-curable (soluble, fusible) resin having an acid number of about 40 to 50 is obtained. A film of the resin applied in solution state to a tin panel cures to a hard, organic solvent-resistant coating upon heating for 10 minutes at 150° C.

*Example 7*

| | Parts |
|---|---|
| Phthalic anhydride | 132.5 |
| Tetrafluorosuccinic acid | 57.0 |
| Glycerol | 116.0 |
| Fatty acids of cottonseed oil | 101.0 | are heated together under an atmosphere of carbon dioxide at 200° to 220° C. until a soluble, fusible resin having an acid number of 30 to 40 is obtained.

*Example 8*

| | Parts |
|---|---|
| Phthalic anhydride | 74.0 |
| Tetrafluorosuccinic acid | 93.1 |
| Benzoic acid | 122.0 |
| Glycerol | 110.0 | are heated together under an atmosphere of carbon dioxide at about 215° C. until a soluble, fusible resin having an acid number of 25 to 40 is obtained.

*Example 9*

| | Parts |
|---|---|
| Phthalic anhydride | 53.3 |
| Tetrafluorosuccinic acid | 199.5 |
| Diethylene glycol | 158.5 |
| Coconut oil | 150.0 | are heated together under an atmosphere of carbon dioxide at 175° to 235° C. until a soluble, fusible resin having an acid number of 25 to 35 is obtained.

*Example 10*

| | Parts |
|---|---|
| Fumaric acid | 31.9 |
| Tetrafluorosuccinic acid | 52.2 |
| Diethylene glycol | 53.0 |
| Tetrahydroabietyl alcohol | 29.2 |

The above-stated amounts of fumaric acid, tetrafluorosuccinic acid and diethylene glycol, together with one-half (14.6 parts) of the tetrahydroabietyl alcohol, are charged into a reaction vessel. The resulting mixture is heated under an atmosphere of carbon dioxide for about 4 hours at 180° C., after which the remainder of the alcohol is added. The reaction mass is now heated to about 200° C. and maintained at that temperature until a heat-convertible resin having an acid number of about 50 to 60 is obtained. The resulting resin is suitable for use in various coating and electrically insulating compositions, for instance compositions containing the above resin and another monomeric material copolymerizable therewith, e. g., diallyl tetrafluorosuccinate, styrene, diallyl phthalate or other monomer or partial polymer such as are mentioned in our copending application Serial No. 738,737, filed concurrently herewith and in the applications referred to therein.

*Example 11*

| | Parts |
|---|---|
| Diethylene glycol | 106.0 |
| Fumaric acid | 87.0 |
| Tetrafluorosuccinic acid | 22.5 |
| Tetrahydroabietyl alcohol | 73.0 |
| Fatty acids of linseeed oil | 70.0 |

The above ingredients are heated together under an atmosphere of carbon dioxide at about 180° C. until a heat-curable resin having an acid number of about 40 to 50 is obtained.

*Example 12*

| | Parts |
|---|---|
| Fumaric acid | 116.0 |
| Tetrafluorosuccinic acid | 87.4 |
| Diethylene glycol | 132.5 |
| Monoglycerides of linseed oil fatty acids | 89.0 |

The above ingredients are heated together under reflux at about 180° C. until a heat-curable resin having an acid number of about 60 to 70 is obtained.

Example 13

| | Parts |
|---|---|
| Glycerol | 17.4 |
| Ethylene glycol | 2.0 |
| Tetrafluorosuccinic acid | 57.0 | are heated together under an atmosphere of carbon dioxide at 175° to 220° C. until a soluble, fusible resin having an acid number of 35 to 45 is obtained.

Example 14

| | Parts |
|---|---|
| Glycerol | 19.3 |
| Phthalic anhydride | 22.2 |
| Tetrafluorosuccinic acid | 28.5 | are heated together under an atmosphere of carbon dioxide at 180° to 215° C. until a soluble, fusible alkyd resin having an acid number of 30 to 40 is obtained. This resin is convertible under heat to a substantially insoluble, substantially infusible state.

Example 15

| | Parts |
|---|---|
| Glycerol | 83.5 |
| Phthalic anhydride | 98.0 |
| Tetrafluorosuccinic acid | 53.6 |
| Fumaric acid | 2.2 |
| Fatty acids of linseed oil | 142.0 |
| Refined linseed oil | 153.0 | are heated together under an atmosphere of carbon dioxide at 150° to 220° C. until a soluble, fusible resin having an acid number of 35 to 45 is obtained. A solution of this resin in mineral spirits, which solution also contains a small amount of a cobalt drier, e. g., cobalt naphthenate, is applied to a tin panel to form a coating thereon. The coated panel is heated for 1 hour at 130° C., whereby a substantially insoluble, substantially infusible resin film is formed on the panel.

Example 16

| | Parts |
|---|---|
| Diethylene glycol | 37.1 |
| Tetrafluorosuccinic anhydride | 57.4 | are heated together under an atmosphere of carbon dioxide at 175° to 220° C. until a resin having an acid number of 20 to 30 is obtained. Tetrafluorosuccinic anhydride may be prepared, for example, as described in our aforementioned copending application Serial No. 731,422, filed February 27, 1947.

Example 17

| | Parts |
|---|---|
| Polymeric allyl alcohol having a hydroxyl number of about 680 | 46.5 |
| Benzoic acid | 73.2 |
| Tetrafluorosuccinic acid | 37.7 |

The polymeric allyl alcohol and the benzoic acid are heated together for 17 hours at 200° C. The resulting partial esterification product and tetrafluorosuccinic acid are then heated together at 170°–200° C. until about 75–80% of the theoretical amount of water has been evolved and a soluble, fusible resin has been obtained.

Example 18

The same general procedure is followed as described under Example 17 with the exception that a fluoromethyl benzoic acid, more particularly 114 parts of trifluoromethyl benzoic acid, is used instead of 73.2 parts of benzoic acid. The resulting resin in cured state is more flame-resistant, that is, it supports combustion less readily, than the cured resinous composition of Example 17.

If desired, equivalent amounts of other fluoroalkyl benzoic acids (e. g., monofluoromethyl benzoic acid, difluoromethyl benzoic acid, the various fluoroethyl benzoic acids, etc.) may be used in place of trifluoromethyl benzoic acid.

Example 19

Cotton cloth is immersed in a 20% dioxane solution of the resin of Example 2. The excess liquid is squeezed out, and the impregnated cloth is heated at 150° C. until the dioxane has been evaporated and the resin has been converted to a substantially insoluble, substantially infusible state. The treated cloth is more flame resistant, that is, it supports combustion less readily, than the untreated cloth or a cloth similarly impregnated with a glyceryl succinate alkyd resin.

The modified and unmodified alkyd resins of this invention are particularly useful in applications where adequate film hardness combined with toughness, flexibility, color stability upon aging or under heat, organic-solvent resistance, heat resistance and resistance to combustion are properties of primary importance. Both the air-drying and baking types of alkyds of this invention may be used in such applications as, for example, the production of printing inks, in paste compositions for application to cloth and the like, in the manufacture of linoleum, in the preparation of paints, varnishes, lacquers, enamels, electrically insulating and other coating compositions, etc. They are compatible with urea-formaldehyde resins, melamine-formaldehyde resins, urea-melamine-formaldehyde resins, cellulose derivatives including cellulose ethers (e. g., ethyl cellulose, etc.), cellulose esters (e. g., cellulose nitrate, etc.), and with many other materials, yielding compositions having improved properties over the unmodified material.

We claim:

1. The method of preparing a resinous polyester which comprises partially esterifying a polymeric allyl alcohol with a monocarboxylic acid selected from the class consisting of nuclearly halogenated benzoic acids, and mono-, di- and trihalogenoalkyl benzoic acids, the carboxyl group of the said monocarboxylic acid being the only substituent thereof which is reactive in an esterification reaction, said partial esterification being effected at a temperature within the range of 150° C. to 250° C., and esterifying the resulting partial esterification product with a member of the class consisting of tetrafluorosuccinic acid, tetrafluorosuccinic anhydride and mixtures thereof, this last esterification reaction likewise being effected at a temperature within the range of 150° C. to 250° C., and the amount of said tetrafluorosuccinic substance being at least 25 mol per cent of the total amount of the said monocarboxylic and tetrafluorosuccinic acid substances employed.

2. The method of preparing a resinous polyester which comprises partially esterifying a polymeric allyl alcohol with a fluoromethyl benzoic acid wherein the fluoromethyl grouping is the only substituent attached to the ring nucleus, said partial esterification being effected at a temperature within the range of 150° C. to 250° C., and esterifying the resulting partial esterification product with tetrafluorosuccinic acid, this last esterification reaction likewise being effected at a temperature within the range of 150° C. to 250° C., and the amount of tetrafluorosuccinic acid being at least 25 mol per cent of the total amount of the said fluoromethyl benzoic and tetrafluorosuccinic acids employed.

3. The method of preparing a resinous polyester which comprises partially esterifying a polymeric allyl alcohol with trifluoromethyl benzoic acid, said partial esterification being effected at a temperature within the range of 150° C. to 200° C., and esterifying the resulting partial esterification product with tetrafluorosuccinic acid, this last esterification reaction likewise being effected at a temperature within the range of 150° C. to 200° C., and the amount of tetrafluorosuccinic acid being from 25 to 70 mol per cent of the total amount of the said trifluoromethyl benzoic and tetrafluorosuccinic acids employed.

4. A resinous polyester of a polyhydric alcohol in which the hydroxyl groups are the only substituents thereof which are reactive in an esterification reaction and which is further characterized by being a polymer of an alcohol having an unsaturated linkage between two carbon atoms in an aliphatic grouping, one of which carbon atoms is directly linked to a saturated carbinol carbon atom, and said polyester containing a plurality of different acyl groups, at least 25 mol per cent of which are tetrafluorosuccinyl groups and the remainder include at least 1 mol per cent of acyl groups of a monocarboxylic acid selected from the class consisting of nuclearly halogenated benzoic acids, and mono-, di- and trihalogenoalkylbenzoic acids, the carboxyl group of the said monocarboxylic acid being the only substituent thereof which is reactive in an esterification reaction.

5. A resinous polyester of a polyhydric alcohol which is a polymer of an aliphatic monohydric alcohol having a terminal methylene grouping attached by an olefinic double bond to a carbon atom which is directly linked to a saturated carbinol carbon atom, and the hydroxyl groups in the said polyhydric alcohol being the only substituents thereof which are reactive in an esterification reaction, said polyester containing a plurality of different acyl groups, at least 25 mol per cent of which are tetrafluorosuccinyl groups and the remainder are acyl groups of a monocarboxylic acid selected from the class consisting of nuclearly halogenated benzoic acids, and mono-, di- and trihalogenoalkyl benzoic acids, the carboxyl group of the said monocarboxylic acid being the only substituent thereof which is reactive in an esterification reaction.

6. A resinous polyester of a polymeric allyl alcohol wherein the average number of primary hydroxyl groups per molecule is between 3 and about 10, said polyester containing a plurality of different acyl groups, at least 25 mol per cent of which are tetrafluorosuccinyl groups and the remainder are acyl groups of trifluoromethyl benzoic acid.

7. A resinous polyester of, by weight, 46.5 parts of polymeric allyl alcohol having a hydroxyl number of about 680; 114 parts of trifluoromethyl benzoic acid; and 37.7 parts of tetrafluorosuccinic acid.

JOHN J. PADBURY.
EDWARD L. KROPA.

REFERENCES CITED

The following references are of record in the file of this patent:

UNITED STATES PATENTS

| Number | Name | Date |
|---|---|---|
| 1,975,246 | Zwilgmeyer | Oct. 2, 1934 |
| 2,186,916 | Wiezevich | Jan. 9, 1940 |
| 2,269,187 | D'Alelio | Jan. 6, 1942 |
| 2,426,224 | Karasch | Aug. 26, 1947 |
| 2,426,913 | Adelson et al. | Sept. 2, 1947 |
| 2,473,124 | Adelson et al. | June 14, 1949 |

OTHER REFERENCES

Grosse et al., Ind. and Eng. Chem., March 1947, pages 367–374.

Ellis, Chemistry of Synthetic Resins, vol. 2, 1935, pp. 862 and 876.